No. 809,530. PATENTED JAN. 9, 1906.
W. A. SANKEY.
PNEUMATIC TIRE COVER.
APPLICATION FILED JAN. 24, 1905.
2 SHEETS—SHEET 1.
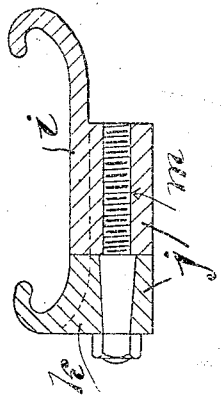
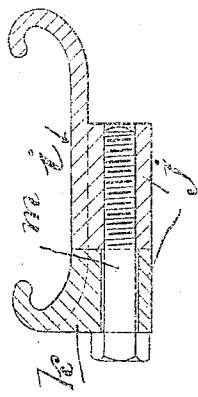
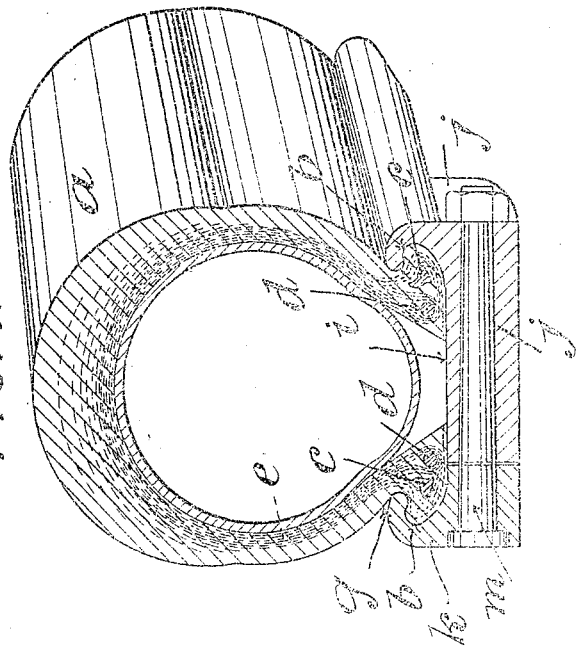
WITNESSES
N. M. Kuehne
John A. Percival
INVENTOR.
William Alfred Sankey
By his Attorneys Richard G.

No. 809,530. PATENTED JAN. 9, 1906.
W. A. SANKEY.
PNEUMATIC TIRE COVER.
APPLICATION FILED JAN. 24, 1905.
2 SHEETS—SHEET 2.
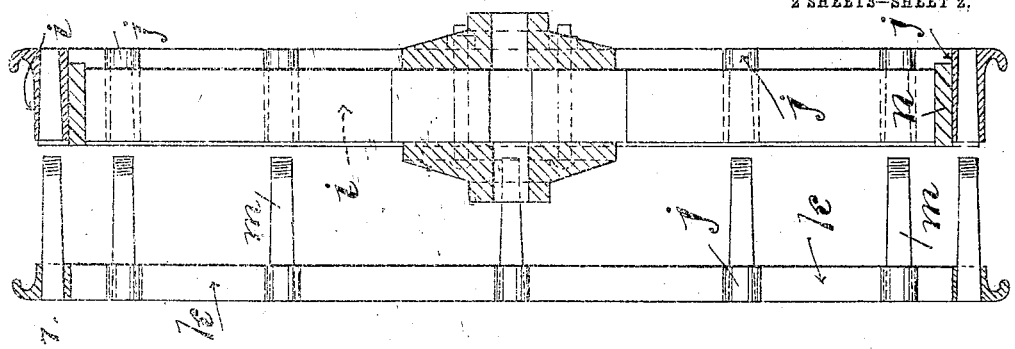
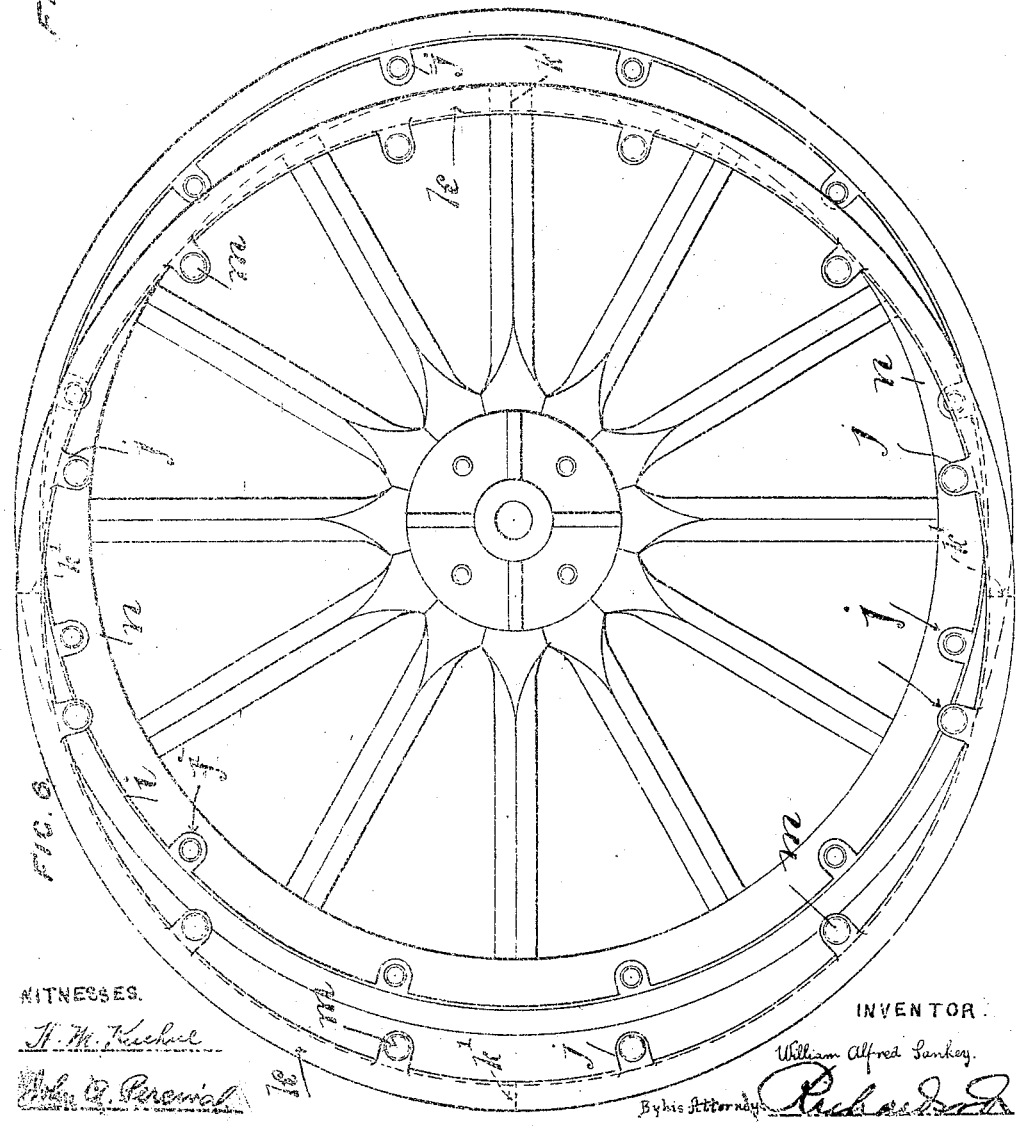

UNITED STATES PATENT OFFICE.

WILLIAM ALFRED SANKEY, OF SUTTON, ENGLAND, ASSIGNOR TO FRANK REDDAWAY, OF MANCHESTER, ENGLAND.

PNEUMATIC-TIRE COVER.

No. 809,530.   Specification of Letters Patent.   Patented Jan. 9, 1906.

Application filed January 24, 1905. Serial No. 242,544.

*To all whom it may concern:*

Be it known that I, WILLIAM ALFRED SANKEY, manager of pneumatic-tire works, a subject of the King of Great Britain, residing at Cumnor Road, Sutton, in the county of Surrey, England, have invented new and useful Improvements in or Relating to Pneumatic-Tire Covers, of which the following is a specification.

My invention relates to pneumatic-tire covers, particularly those for use on the wheels of motor-cars and similar heavy road vehicles, and has reference to the means for securing such covers upon wheel-rims. At present the two most popular means for securing such tire-covers upon the rim are the endless wire and the thickened or beaded edge. Generally the objection to an endless wire is that though there is no risk or liability of the cover being wrenched off the rim it allows the cover to "creep." Moreover, although the endless wire is suitable for cycle-rims owing to its inextensibility, it cannot be well used with motor-wheel rims which are formed with a flat base instead of a recess, as in a cycle-rim, which makes it practically impossible to get the cover with wired edges on or off the rim. With a thickened or beaded edge fitting into recesses in the sides of the rim this liability to creep is obviated to a great extent. It is found necessary, however, with a thickened edge to provide clamps to bind the edges of the tire down upon the rim at intervals; otherwise any great and sudden side wrench on the tire is sufficient to force the cover off the rim, in some cases with very disastrous results. It has been found in practice even with such clamping devices, which are generally four in number at intervals around the wheel, that when the car is heavily loaded and a sudden and powerful side strain is brought to bear on the tire the cover can be wrenched off in the spaces between the clamps. This is largely due to the fact that it is absolutely necessary that a certain amount of elasticity or extensibility must be provided for in the beaded edges of the cover; otherwise it would be impossible to get the cover on or off the rim.

My invention consists in the combination, in the edges of the cover, of the endless wire of less diameter than the outer diameter of the wheel-rim, with a thickened or beaded edge fitting into recesses in the sides of the rim. By this means I obtain the advantages of both systems, with their disadvantages neutralized. For instance, the thickened edge forced by the internal air-tube into recesses in the sides of the rim prevents "creeping" of the tire, while the endless wire cannot be forced over the sides of the rim by any sudden wrench and the tire is securely held on the rim, enabling me to dispense with the clamps employed when using thickened edges alone. When using such compound means for securing the tire-covers upon the wheel-rims, as the wired and beaded edges are absolutely inextensible I employ a rim with a removable edge or side to facilitate the placing of the cover upon the rim, and in order that my invention may be fully understood I have attached drawings hereto, to which I will now refer.

Figure 1 shows in cross-section a tire-cover made in accordance with my invention fitted upon a rim with a removable edge. Figs. 2 and 3 are detail views to which I will refer. Figs. 4 and 5 are modified ways of securing the removable edge to the rim. Fig. 6 is a face view of a wheel provided with a rim having a removable edge, the loose edge being removed. Fig. 7 is an edge view of same, showing the method of attaching or detaching the removable edge.

Referring to Fig. 1 of the drawings, it will be seen that the tire-cover $a$ is formed with beaded edges $b$, having a core $c$ of hard rubber or other material and an endless wire $d$. A great advantage of my invention will be seen from a comparison of the enlarged sectional views, Figs. 2 and 3. Fig. 2 represents the method of construction at present employed with tires having beaded edges. The dotted lines $e$ represent the different layers of canvas employed, of which a portion only are brought around the bead $c$ at $f$. This portion (shown as three in number in the figure, although this number varies in practice) takes the powerful strain which is exerted upon the cover at the point $g$. The remaining or inner layers of canvas are idle. On the contrary, with the combined beaded edge and endless wire it is possible to utilize all the layers of canvas to resist strains. It will be seen from Fig. 3 that while the outer layers of canvas are passed around the outside of the bead $c$, as before, the inner layers (shown three in number) instead of being free at the ends, as in Fig. 2, are looped round the endless wire $d$ and stitched at $h$. The inner layers of canvas are thus secured to the inextensible wire $d$ and are able to assist in resisting strains on the tire-cover.

As already stated, the edges of the tire-cover made in accordance with my invention are inextensible. Therefore I use in conjunction therewith a rim in which one edge, or a portion of it, can be removed. The rim $i$ is provided at intervals on its under surface with snugs or projections $j$, and one edge $k$ of the rim is cut away through these projections, or this part of the rim may be cast or formed separate from the rest of the rim. The removable edge $k$ may be continuous or in segments, as shown in dotted lines at $k'$. To the snugs $j$ on the removable edge $k$ of the rim I firmly secure bolts $m$, preferably taper, and bore out the snugs $j$ on the rim $i$ to receive these bolts, and by means of nuts secure the edge $k$ to the rim, as will be apparent from an inspection of the drawings. The rim $k$ is secured upon the wooden felly $n$ of an ordinary or suitable motor-car wheel, depressions or recesses being provided on the periphery of the wheel to receive the snugs $j$ of the rim $i$. The bolts $m$ may be secured to the snugs on the rim $i$ instead of the removable edge $k$, as shown in Fig. 4, or, as shown in Fig. 5, the bolts could be loose and passed through the removable edge $k$ and screwed into the rim $i$. It will be understood that the removable edge of the rim is arranged at the outside of the wheel when mounted on the axle for convenience of manipulation. When made in segments, it may be necessary to remove one or two only of such segments, and not the whole, to remove or replace the tire-cover.

I declare that what I claim is—

1. A tire-cover having beaded edges and a wire embedded in each of said edges, layers of canvas in such tire-cover part of which are secured around the cores of the beaded edges and the remainder around the wires in such edges, substantially as described.

2. The combination in a vehicle-wheel having its periphery provided with lateral recesses, a channeled rim fitting on said periphery and having lugs engaging in the said recesses, said channeled rim being formed of a stationary part and a removable part, bolts passing through the lugs of the removable and stationary parts to hold said parts together and a cover held in said channeled rim, substantially as described.

In testimony whereof I have signed my name to this specification in the presence of two subscribing witnesses.

WILLIAM ALFRED SANKEY.

Witnesses:
ALFRED NUTTING,
R. F. WILLIAMS.